(12) United States Patent
King (10) Patent No.: US 10,624,725 B2
(45) Date of Patent: Apr. 21, 2020

(54) ORAL RINSING APPARATUS (71) Applicant: Brian King, Chicago, IL (US)

(72) Inventor: Brian King, Chicago, IL (US)

(*) Notice: Subject to any disclaimer, the term of this patent is extended or adjusted under 35 U.S.C. 154(b) by 0 days.

(21) Appl. No.: 16/110,638

(22) Filed: Aug. 23, 2018

(65) Prior Publication Data
US 2019/0060039 A1 Feb. 28, 2019

Related U.S. Application Data

(60) Provisional application No. 62/549,214, filed on Aug. 23, 2017.

(51) Int. Cl.
*A61C 17/02* (2006.01)
*B05B 1/00* (2006.01)
*A61C 1/00* (2006.01)
*A61C 17/032* (2006.01)

(52) U.S. Cl.
CPC ........ *A61C 17/0202* (2013.01); *A61C 1/0084* (2013.01); *A61C 17/032* (2019.05); *B05B 1/00* (2013.01); *A61C 2204/002* (2013.01)

(58) Field of Classification Search
CPC .................. A61C 17/0202; A61C 17/0214
See application file for complete search history.

(56) References Cited

U.S. PATENT DOCUMENTS

| | | | | |
|---|---|---|---|---|
| 2,733,713 A | * | 2/1956 | Kabnick | A61H 13/005 604/151 |
| 3,874,083 A | * | 4/1975 | Buckley | A61C 17/0217 433/80 |
| 4,907,744 A | * | 3/1990 | Jousson | A61C 17/0202 137/625.44 |
| 5,062,795 A | * | 11/1991 | Woog | A61C 17/02 433/80 |
| 6,866,208 B2 | * | 3/2005 | Kao | B05B 1/1654 239/390 |
| 7,156,324 B2 | * | 1/2007 | Birrenkott | B05B 7/2443 239/345 |
| 7,281,673 B2 | * | 10/2007 | Burnworth | B05B 1/1636 239/392 |
| 7,407,117 B2 | * | 8/2008 | Dodd | B05B 7/2443 222/145.8 |
| 9,533,331 B1 | * | 1/2017 | Kane | F28G 9/00 |
| 2017/0224452 A1 | * | 8/2017 | Chang | A61C 17/02 |

* cited by examiner

*Primary Examiner* — Ralph A Lewis (57) ABSTRACT

An oral rinsing apparatus that washes away plaque, bacteria, and food debris that might reside on the teeth and along the gumline includes a handle, a nozzle, and a water supply line. The handle is adjacently attached to the nozzle. The water supply line that is connected to the handle and positioned opposite to the nozzle. The water supply line is in fluid communication with an existing water source diverter and provides a stream of water into the handle and the nozzle. The stream of water then flows through a first channel of the handle and a second channel of the nozzle before discharges through a head of the nozzle. A flow-activation button of the handle turns on and off the stream of water that exits through the head as a plurality of flow control settings are integrated into the head.

15 Claims, 8 Drawing Sheets

ORAL RINSING APPARATUS

The current application claims a priority to the U.S. Provisional Patent application Ser. No. 62/549,214 filed on Aug. 23, 2017.

FIELD OF THE INVENTION

The present invention relates generally to a rinsing apparatus that is capable of being linked to an established water supply. More specifically, the present invention is an oral ringing apparatus for the purposes of rinsing food debris on an individual's teeth that are normally left behind from a toothbrush.

BACKGROUND OF THE INVENTION

Presently, the most common routine of cleaning one's teeth is restricted to manual; or electrically driven toothbrushes. However, electrically driven water picks and accompanying pumps also used by many individuals in conjunction with the toothbrush. The electrically driven water picks represent a readily prepared apparatus for more comprehensive cleaning process for the purposes of cleaning teeth, but require the selection of head, the replacement thereof, and a known power source. More specifically, the water pick is a type of oral hygiene product that pushes water (or mouthwash) into the mouth at pressure through a nozzle. The intention is that the pressure of the water dislodges and washes away plaque, bacteria, and food debris that might reside on the teeth and along the gumline. The water picks are designed primarily to assist with interdental cleaning, the gaps in between your teeth, where regular toothbrushes don't reach or clean as well. However, existing water picks are also very cumbersome and takes up a significant counter space. This can be problematic for smaller bathrooms or smaller vanities with minimum counter space. Additionally, existing water picks are expensive due to the complicated manufacturing process and configurations.

It is an objective of the present invention provide an oral rinsing apparatus that overcomes the aforementioned problems. More specifically, the present invention seeks to circumvent these limitations and be readily usable by merging the comprehensive nature of the water pick, and the grab and go nature of the toothbrush by providing a body that may be used in the shower, or at the sink by hooking up to an existing water source diverter. The present invention operates through a stream of water from the water source diverter while diverting the stream of water through a handle body and a nozzle of the present invention. The stream of water is then discharged through a head of nozzle, wherein the user is able to select different types of flow control settings for the stream of water. By forwarding the stream of water the present invention overcomes the shortcomings experienced by the both the toothbrush and the existing water picks by merging their functionality and allowing the driving force to be a pre-established water supply or faucet.

DETAIL DESCRIPTIONS OF THE INVENTION

All illustrations of the drawings are for the purpose of describing selected versions of the present invention and are not intended to limit the scope of the present invention.

Figure 1:
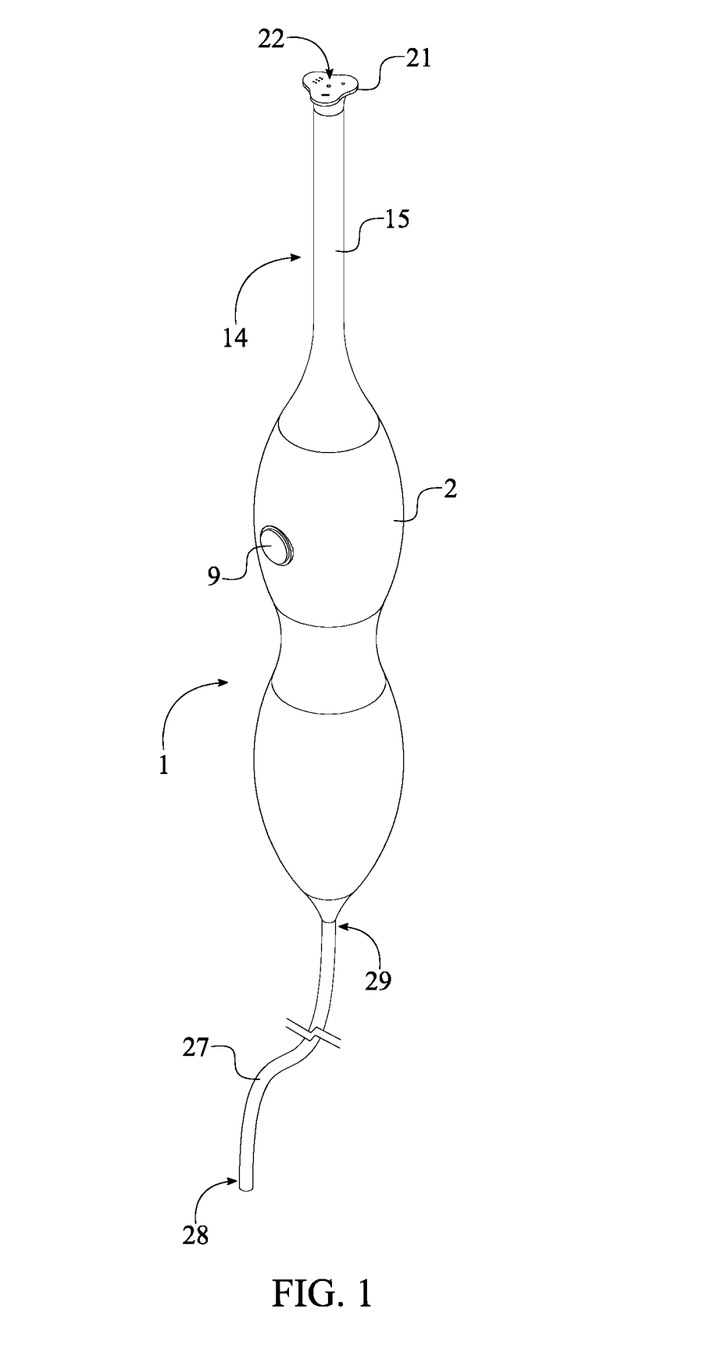
FIG. 1 is a perspective view of the present invention.
Figure 2:
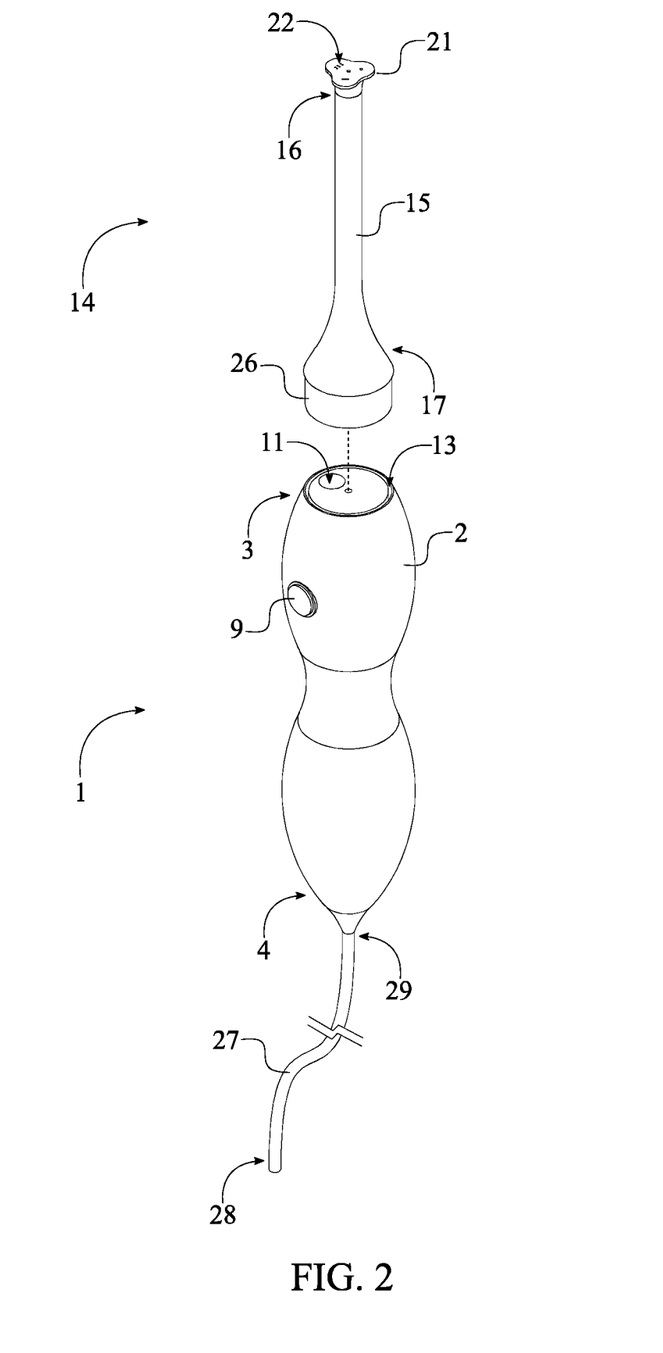
FIG. 2 is an exploded perspective view of the present invention.
Figure 3:
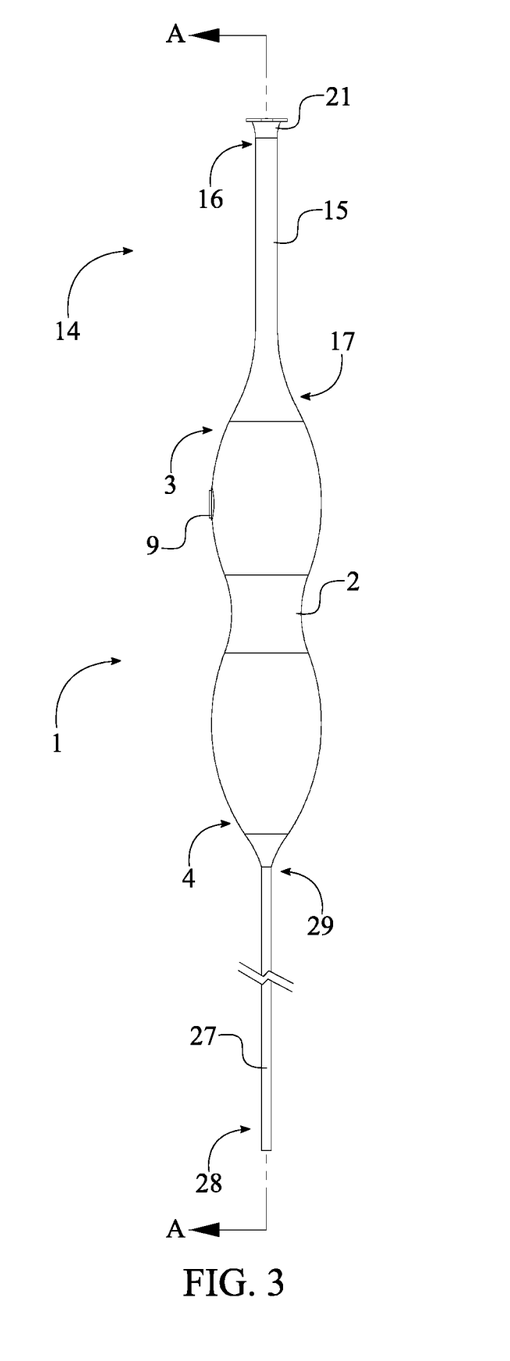
FIG. 3 is a side view of the present invention, showing the plane upon which a cross sectional view is taken shown in FIG. 4.

The present invention is an oral rinsing apparatus that wash away plaque, bacteria, and food debris that might reside on the teeth and along the gumline. The present invention is designed primarily to assist with interdental cleaning, the gaps in between your teeth, where regular toothbrushes don't reach or clean as well. The present invention comprises a handle 1, a nozzle 14, and a water supply line 27 as shown in FIG. 1-3. The handle 1 that enables a user to grasp the present invention during operation comprises a handle body 2, a first channel 5, and a flow-activation button 9. The nozzle 14 that discharges a stream of water comprises a nozzle body 15, a second channel 18, a head 21, and a plurality of flow control settings 22. The water supply line 27 draws the stream of water from a shower, a sink faucet, or an existing water line through a water source diverter so that the stream of water can be discharged though the handle 1 and the nozzle 14. In reference to the general configuration of the present invention, the nozzle 14 is adjacently attached to the handle 1 so that the user is able to grip 8 the handle 1 and point the nozzle 14 towards the teeth and gumline. The water supply line 27 is terminally connected to the handle 1 and positioned opposite of the nozzle 14. The water supply line 27 is in fluid communication with the handle 1 and nozzle 14 of that the stream of water can be discharged through the nozzle 14 and into the teeth and gumline.

Figure 6:
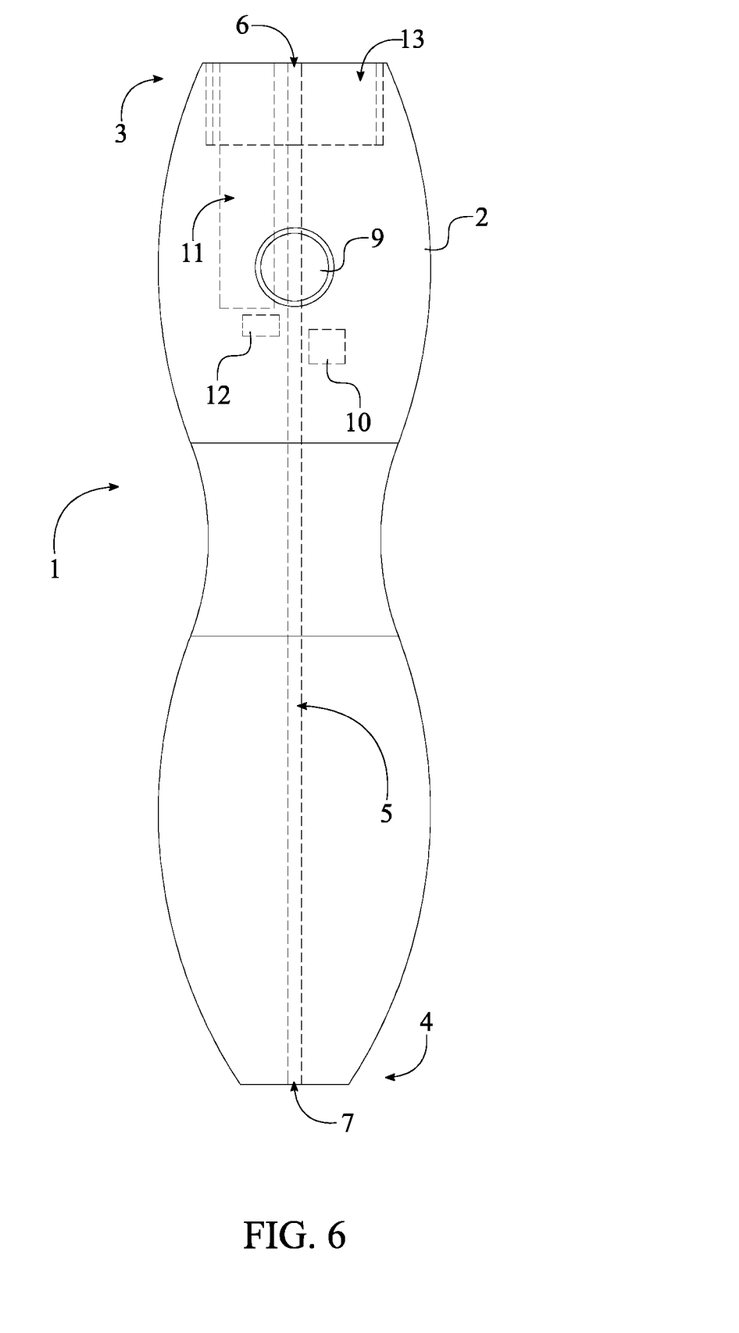
FIG. 6 is a side view of the handle of the present invention, wherein the dash lines illustrates the internal components

In reference to FIG. 6, the handle 1 further comprises an outlet aperture 6 and an inlet aperture 7. The handle body 2 is a preferably organic or doubly conjoined ovular geometry to permit easy grasping and handling in damp conditions. The handle 1 may however use additional geometries that are conducive to gripping in damp or slipper conditions. The first channel 5 traverses along the handle body 2, wherein the first channel 5 is an interior body flow cavity that passes through the entire longitudinal length of the handle body 2. The outlet aperture 6 and the inlet aperture 7 are delineated by the first channel 5 at each terminal end. More specifically, the outlet aperture 6 is positioned adjacent to a top end 3 of the handle body 2. The inlet aperture 7 is positioned adjacent to a bottom end 4 of the handle body 2. As a result, the inlet aperture 7, the first channel 5, and the outlet aperture 6 allow the stream of water to travel through the handle 1 when the present invention is operational.

Figure 4:
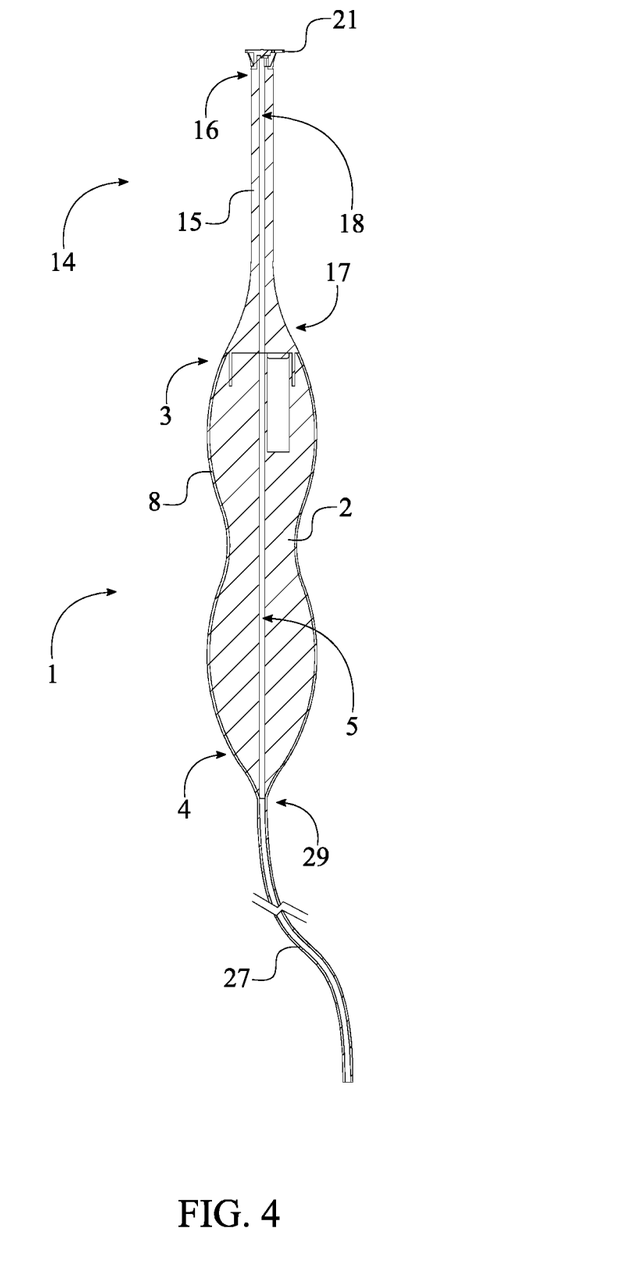
FIG. 4 is a cross section view of the present invention taken along line A-A of FIG. 3.

In reference to FIG. 4, the handle 1 further comprises a grip 8 that enhances friction between the user's hand and the handle body 2. The grip 8 is preferably made from rubber or other modestly frictional material in a damp or slippery state. The grip 8 is superimposed onto the handle body 2 so that the grip 8 would be able to externally encase around the handle body 2 entirely with exception to other externally positioned components of the handle 1.

Figure 8:
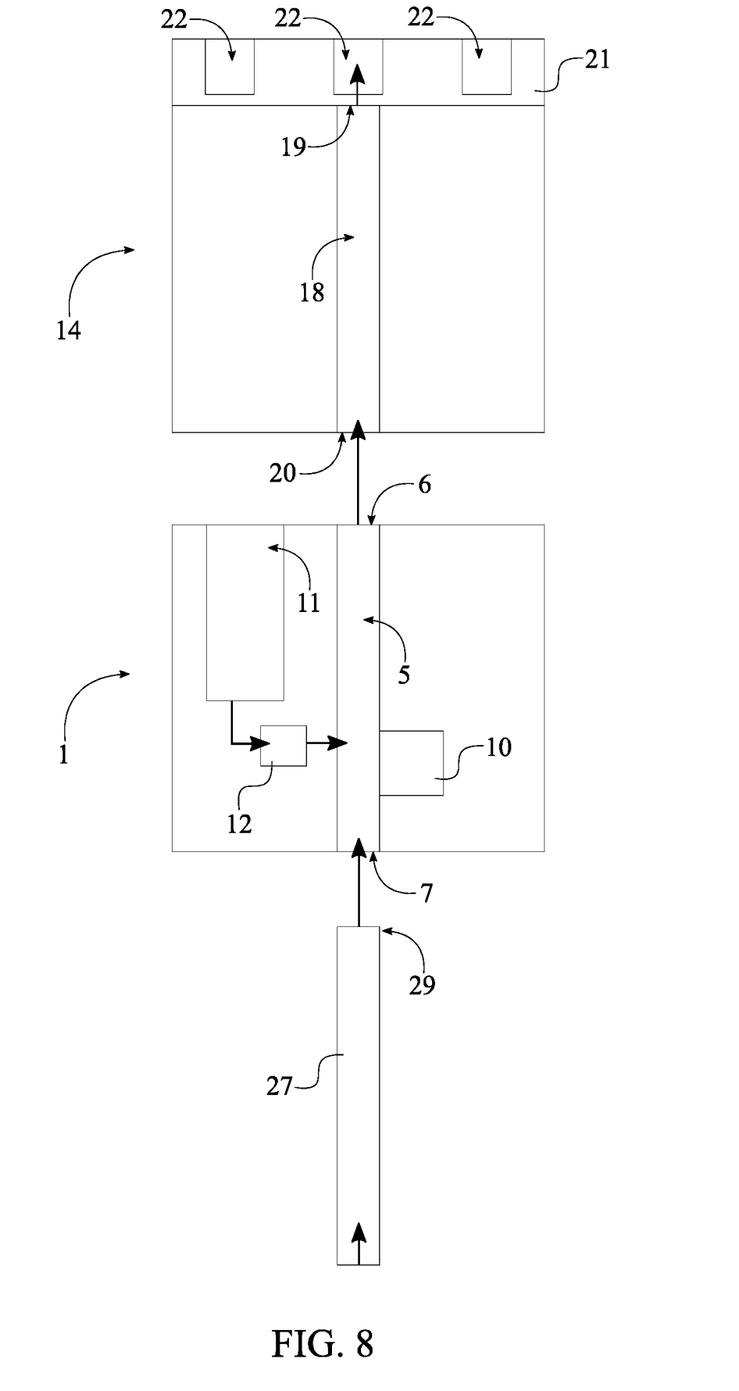
FIG. 8 is a schematic view showing the in-fluid communication of the present invention.

In reference to FIG. 6 and FIG. 8, the handle 1 further comprises a valve 10 that operatively coupled with the flow-activation button 9 to turn on and off the stream of water. More specifically, the flow-activation button 9 is integrated into the handle body 2 so that the user is able to easily access the flow-activation button 9. In other words, the flow-activation button 9 is Located near the center of one of the ovular surfaces and exposed on the outermost surfaces. The valve 10 functions as a gate valve 10 to turn on and turn off the stream of water through the flow-activation button 9. More specifically, once the flow-activation button 9 is pushed, the flow-activation button 9 actuates the valve 10 preferably through a mechanical force or a spring force so that the valve 10 can be opened or closed. In order to attain the opened and closed configurations for the present invention, the valve 10 is mounted within the handle body 2 and is in fluid communication with the first channel 5. Since the flow-activation button 9 is operatively coupled with the valve 10, the flow-activation button 9 is able to selectively open and close the valve 10. For example, when the valve 10 is opened through the flow-activation button 9, the stream of water travels from the inlet aperture 7 to the outlet aperture 6 through the valve 10. When the valve 10 is closed through the flow-activation button 9, the stream of water travels from the inlet aperture 7 to the valve 10 and stops at the valve 10. In an alternative embodiment, the valve 10 can be operated through a battery powered servo, a battery powered magnet, or an electronic circuit once the flow-activation button 9 is actuated.

In reference to FIG. 6 and FIG. 8, the handle 1 further comprises a reservoir 11 and a check valve 12 so that the present invention can introduce and intermix a flow of mouthwash into the stream of water. More specifically, the reservoir 11 traverses into the top end 3 of the handle body 2 so that the user is able to access the reservoir 11 with the removal of the nozzle 14. The check valve 12 is mounted within the handle body 2 so that the reservoir 11 can be in fluid communication with the first channel 5 through the check valve 12. As a result, the reservoir 11 allows the restocking of mouthwash or other rinsing liquid so the flow of mouthwash can be discharges into the first channel 5 through the check valve 12. Due to the functionality of the check valve 12, the stream of water does not get into the reservoir 11 once the present invention is operational.

Figure 5:
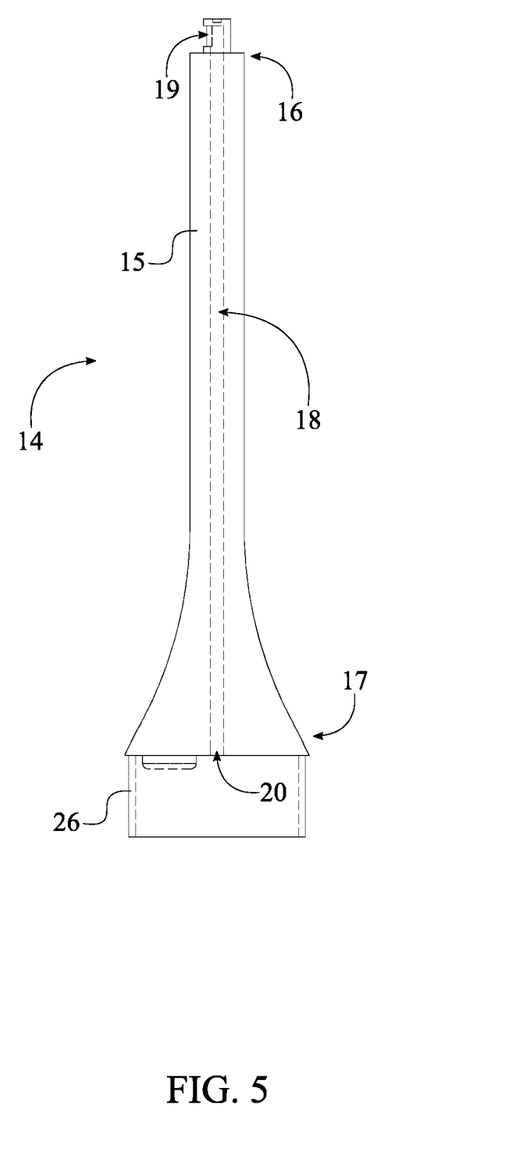
FIG. 5 is a side view of the nozzle of the present invention, wherein the dash lines illustrates the internal components.

In reference to FIG. 2, FIG. 5, and FIG. 8, the nozzle 14 is a preferably detachable body that can be disengaged from the handle 1 to restock the mouthwash or interchange different embodiments of the nozzle 14. The nozzle 14 preferably possess a tapered geometry that reduces diameter relative to height so that the nozzle 14 can be inserted or placed along narrow places of the teeth and gumline. The second channel 18 traverses along the nozzle body 15, wherein the second channel 18 is an interior body flow cavity that passes through the entire longitudinal length of the nozzle body 15. The outlet opening 19 and the inlet opening 20s are delineated by the second channel 18 at each terminal end. More specifically, the outlet opening 19 is positioned adjacent to a top end 16 of the nozzle body 15. The inlet opening 20 is positioned adjacent to a bottom end 17 of the nozzle body 15. As a result, the inlet opening 20, the second channel 18, and the outlet opening 19 allow the stream of water to travel through the nozzle 14 when the present invention is operational. The head 21 is rotatably connected to the top end 16 of the nozzle body 15 so that the head 21 is able to rotate a full 360 degrees about the nozzle body 15. As a result, the user is able to selectively choose each of the plurality of flow control settings 22 through the rotation of the head 21. More specifically, the plurality of flow control settings 22 traverses through the head 21 so that the each of the plurality of flow control settings 22 can be individually in fluid communication with the outlet opening 19.

Figure 7:
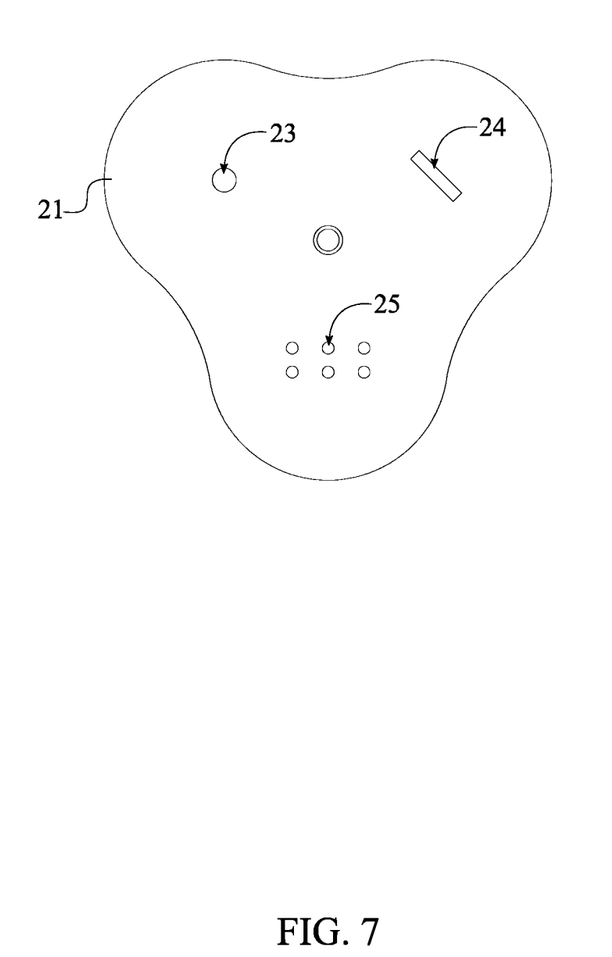
FIG. 7 is a top view of the head of the present invention showing the plurality of flow control settings.

In reference to FIG. 7-8, the plurality of flow control settings 22 comprises a jet opening 23, a flat opening 24, and a plurality of stream openings 25 thus enabling the user to select three different profiles to discharge the stream of water. The jet opening 23 is a curvilinear aperture that discharges a solid and narrow stream of water from the head 21. The flat opening 24 is a slender aperture that discharges a fan of water from the head 21. The plurality of stream openings 25 is a larger subset of apertures or a cluster of at least two rows of apertures that discharges multiple streams of water from head 21. More specifically, the jet opening 23, the flat opening 24, and the plurality of stream opening are perimetrically positioned around the head 21 and radially spaced apart from each other. As a result, each of the plurality of flow control settings 22 can be selectively in fluid communication with the outlet opening 19 through the rotation of the head 21. For example, when the jet opening 23 is aligned with the outlet opening 19 through the rotation of the head 21, the flat opening 24 and the plurality of stream openings 25 are positioned away from the outlet opening 19 and not aligned with the outlet opening 19. As a result, the outlet opening 19 is in fluid communication with only the jet opening 23 thus discharging the stream of water through the jet opening 23 and not the flat opening 24 or the plurality of stream openings 25.

In reference to FIG. 2 that illustrates the attachment between the handle 1 and the nozzle 14, the top end 3 of the handle body 2 is terminally attached to the bottom end 17 of the nozzle body 15 so that the bottom end 17 of the nozzle 14 sits flush with the top end 3 of the handle body 2. More specifically, the handle 1 further comprises a female connector 13, the nozzle 14 further comprises a male connector 26. The female connector 13 traverses into the top end 3 of the handle body 2 thus preferably delineating a ring like opening into the handle 1. The male connector 26 is adjacently connected to the bottom end 17 of the nozzle body 15, wherein the shape of the male connector 26 mimics a similar shape as the female connector 13. As a result, the male connector 26 is preferably attached to the female connector 13 through a snap fitting fastening mechanism. However, the attachment between the handle 1 and the nozzle 14 is not limited the snap fitting fastening mechanism can be any other type of detachable fastening mechanism such as a tolerance fitting fastening mechanism, a magnetic fitting fastening mechanism, a screw fastening mechanism.

In reference to FIG. 8, the water supply line 27 is terminally connected to the bottom end 4 of the handle body 2 and positioned opposite of the nozzle 14. The water supply line 27 is a flexible tubing that discharges the stream of water into the handle 1 from the water source diverter so that the user is able to easily maneuver the handle 1. In order to discharge the stream of water within the present invention, the water supply line 27 is in fluid communication with the plurality of flow control settings 22 through the first channel 5 and the second channel 18. More specifically, the water supply line 27 comprises an inlet end 28 and an outlet end 29, forming a tubular structure. The inlet end 28 and the outlet end 29 are oppositely positioned of each other along the length of the water supply line 27. The outlet end 29 is in fluid communication with the inlet aperture 7 while the inlet end 28 is in fluid communication with the water source diverter. As a result, the stream of water can be discharged from the water source diverter to the first channel 5 through the inlet aperture 7. Considering valve 10 is at the opened position through the operation of the flow-activation button 9, the outlet aperture 6 is in fluid communication with the inlet opening 20. As a result, the stream of water from the first channel 5 can be discharges into the second channel 18 through the inlet opening 20. Since the outlet opening 19 is selectively and individually in fluid communication with each of the plurality of flow control settings 22, the user is able to discharges the stream of water through one of the plurality of flow control settings 22.

Although the invention has been explained in relation to its preferred embodiment, it is to be understood that many other possible modifications and variations can be made without departing from the spirit and scope of the invention as hereinafter claimed.

What is claimed is:

1. An oral rinsing apparatus comprises:
   a handle;
   a nozzle;
   a water supply line;
   the handle comprises a handle body, a first channel, and a flow-activation button;
   the nozzle comprises a nozzle body, a second channel, a head, and a plurality of flow control settings;
   the first channel traversing along the handle body;
   the flow-activation button being integrated into the handle body;
   the second channel traversing along the nozzle body;
   the plurality of flow control settings traversing through the head;
   the head being rotatably connected to a top end of the nozzle body;
   a top end of the handle body being terminally attached to a bottom end of the nozzle body;
   the water supply line being terminally connected to a bottom end of the handle body, opposite of the nozzle;
   the water supply line being in fluid communication with the plurality of flow control settings through the first channel and the second channel;
   the handle further comprises a reservoir and a check valve;
   the reservoir traversing into the top end of the handle body;
   the check valve being mounted within the handle body;
   the reservoir being in fluid communication with the first channel through the check valve;
   the nozzle being removably attached to the handle; and
   the reservoir being visually hidden inside the handle in response to the nozzle being attached to the handle.

2. The oral rinsing apparatus as claimed in claim 1 comprises:
   the handle further comprises an outlet aperture and an inlet aperture;
   the outlet aperture and the inlet aperture being delineated by the first channel;
   the outlet aperture being positioned adjacent to the top end of the handle body; and
   the inlet aperture being positioned adjacent to the bottom end of the handle body.

3. The oral rinsing apparatus as claimed in claim 1 comprises:
   the handle further comprises a grip; and
   the grip being superimposed onto the handle body.

4. The oral rinsing apparatus as claimed in claim 1 comprises:
   the handle further comprises a valve;
   the valve being mounted within the handle body;
   the valve being in fluid communication with the first channel; and
   the valve being operatively coupled with the flow-activation button, wherein the flow-activation button selectively opens and closes the valve.

5. The oral rinsing apparatus as claimed in claim 1 comprises:
   the nozzle further comprises an outlet opening and an inlet opening;
   the outlet opening and the inlet opening being delineated by the second channel;
   the outlet opening being positioned adjacent to the top end of the nozzle body; and
   the inlet opening being positioned adjacent to the bottom end of the nozzle body.

6. The oral rinsing apparatus as claimed in claim 1 comprises:
   the plurality of flow control settings comprises a jet opening, a flat opening, and a plurality of stream openings;
   the jet opening, the flat opening, and the plurality of stream opening being perimetrically positioned around the head;
   the jet opening, the flat opening, and the plurality of stream opening being radially spaced apart from each other; and
   each of the plurality of flow control settings being selectively in fluid communication with an outlet opening of the nozzle.

7. The oral rinsing apparatus as claimed in claim 1 comprises:
   the handle further comprises a female connector;
   the nozzle further comprises a male connector;
   the female connector traversing into the top end of the handle body;
   the male connector being adjacently connected to the bottom end of the nozzle body; and
   the male connector being attached to the female connector.

8. The oral rinsing apparatus as claimed in claim 1 comprises:
   the water supply line comprises an inlet end and an outlet end;
   the inlet end and the outlet end being oppositely positioned of each other along the water supply line;
   the outlet end being in fluid communication with an inlet aperture of the handle;
   an outlet aperture of the handle being in fluid communication with the inlet opening of the nozzle; and
   an outlet opening of the nozzle being selectively in fluid communication with each of the plurality of flow control settings.

9. An oral rinsing apparatus comprises:
   a handle;
   a nozzle;
   a water supply line;
   the handle comprises a handle body, a first channel, a valve, and a flow-activation button;
   the nozzle comprises a nozzle body, a second channel, a head, and a plurality of flow control settings;
   the first channel traversing along the handle body;
   the valve being mounted within the handle body;

the valve being in fluid communication with the first channel;

the flow-activation button being integrated into the handle body;

the valve being operatively coupled with the flow-activation button, wherein the flow-activation button selectively opens and closes the valve;

the second channel traversing along the nozzle body;

the plurality of flow control settings traversing through the head;

the head being rotatably connected to a top end of the nozzle body;

a top end of the handle body being terminally attached to a bottom end of the nozzle body;

the water supply line being terminally connected to a bottom end of the handle body, opposite of the nozzle;

the water supply line being in fluid communication with the plurality of flow control settings through the first channel and the second channel;

the handle further comprises a reservoir and a check valve;

the reservoir traversing into the top end of the handle body;

the check valve being mounted within the handle body;

the reservoir being in fluid communication with the first channel through the check valve;

the nozzle being removably attached to the handle; and the reservoir being visually hidden inside the handle in response to the nozzle being attached to the handle.

10. The oral rinsing apparatus as claimed in claim 9 comprises:

the handle further comprises an outlet aperture and an inlet aperture;

the outlet aperture and the inlet aperture being delineated by the first channel;

the outlet aperture being positioned adjacent to the top end of the handle body; and the inlet aperture being positioned adjacent to the bottom end of the handle body.

11. The oral rinsing apparatus as claimed in claim 9 comprises:

the handle further comprises a grip; and the grip being superimposed onto the handle body.

12. The oral rinsing apparatus as claimed in claim 9 comprises:

the nozzle further comprises an outlet opening and an inlet opening;

the outlet opening and the inlet opening being delineated by the second channel;

the outlet opening being positioned adjacent to the top end of the nozzle body; and the inlet opening being positioned adjacent to the bottom end of the nozzle body.

13. The oral rinsing apparatus as claimed in claim 9 comprises:

the plurality of flow control settings comprises a jet opening, a flat opening, and a plurality of stream openings;

the jet opening, the flat opening, and the plurality of stream opening being perimetrically positioned around the head;

the jet opening, the flat opening, and the plurality of stream opening being radially spaced apart from each other; and each of the plurality of flow control settings being selectively in fluid communication with an outlet opening of the nozzle.

14. The oral rinsing apparatus as claimed in claim 9 comprises:

the handle further comprises a female connector;

the nozzle further comprises a male connector;

the female connector traversing into the top end of the handle body;

the male connector being adjacently connected to the bottom end of the nozzle body; and the male connector being attached to the female connector.

15. The oral rinsing apparatus as claimed in claim 9 comprises:

the water supply line comprises an inlet end and an outlet end;

the inlet end and the outlet end being oppositely positioned of each other along the water supply line;

the outlet end being in fluid communication with an inlet aperture of the handle;

an outlet aperture of the handle being in fluid communication with the inlet opening of the nozzle; and an outlet opening of the nozzle being selectively in fluid communication with each of the plurality of flow control settings.

* * * * *